(12) United States Patent
Kritt et al.

(10) Patent No.: US 8,917,913 B2
(45) Date of Patent: Dec. 23, 2014

(54) SEARCHING WITH FACE RECOGNITION AND SOCIAL NETWORKING PROFILES

(75) Inventors: Barry A. Kritt, Raleigh, NC (US); Thomas R. Mazzeo, Durham, NC (US); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 347 days.

(21) Appl. No.: 13/240,022

(22) Filed: Sep. 22, 2011

(65) Prior Publication Data

US 2013/0077833 A1  Mar. 28, 2013

(51) Int. Cl.
G06K 9/00 (2006.01)

(52) U.S. Cl.
CPC ........ *G06K 9/00288* (2013.01); *G06K 9/00677* (2013.01)
USPC ........................... 382/118; 340/5.52; 340/5.53

(58) Field of Classification Search
CPC ........................ G06K 9/00288; G06K 9/00677
USPC ......... 382/115–118, 124, 181, 190, 209, 217, 382/218, 312; 340/5.52–5.54, 5.82–5.84; 709/206; 707/722, 723
See application file for complete search history.

(56) References Cited

U.S. PATENT DOCUMENTS

| | | | |
|---|---|---|---|
| 7,529,772 B2 | 5/2009 | Singh | |
| 7,581,108 B1 | 8/2009 | Bohm et al. | |
| 7,664,389 B2 | 2/2010 | Kretz et al. | |
| 7,680,324 B2 | 3/2010 | Boncyk et al. | |
| 7,894,639 B2 * | 2/2011 | Grim et al. | 382/118 |
| 8,005,272 B2 * | 8/2011 | Grim et al. | 382/118 |
| 8,014,573 B2 * | 9/2011 | Boomer et al. | 382/118 |
| 8,041,082 B1 | 10/2011 | Baluja et al. | |
| 8,156,152 B2 * | 4/2012 | Zou et al. | 707/798 |
| 8,285,713 B2 * | 10/2012 | Luo et al. | 707/723 |
| 8,311,289 B2 | 11/2012 | Vanhoucke et al. | |
| 8,341,145 B2 * | 12/2012 | Dodson et al. | 707/722 |
| 8,416,997 B2 * | 4/2013 | Winters et al. | 382/118 |
| 8,588,482 B1 | 11/2013 | Baluja et al. | |
| 8,737,688 B2 | 5/2014 | Murphy | |
| 8,780,162 B2 | 7/2014 | Murphy | |
| 2004/0066966 A1 | 4/2004 | Schneiderman | |
| 2005/0256756 A1 | 11/2005 | Lam et al. | |
| 2006/0002607 A1 | 1/2006 | Boncyk et al. | |
| 2007/0013776 A1 | 1/2007 | Venetianer et al. | |
| 2007/0081090 A1 | 4/2007 | Singh | |
| 2007/0122005 A1 | 5/2007 | Kage et al. | |
| 2007/0172155 A1 | 7/2007 | Guckenberger | |
| 2008/0052312 A1 | 2/2008 | Tang et al. | |
| 2008/0130960 A1 * | 6/2008 | Yagnik | 382/118 |
| 2008/0288612 A1 | 11/2008 | Kwon | |

(Continued)

OTHER PUBLICATIONS

IBM et al., "Using Person Profile Database and Algorithm to Use Context to Enhance Face Recognition in Photos", IPCOM000204209D, Feb. 18, 2011.

(Continued)

*Primary Examiner* — Chan Park
*Assistant Examiner* — Mia M Thomas
(74) *Attorney, Agent, or Firm* — Scully, Scott, Murphy & Presser, P.C.

(57) ABSTRACT

Systems for performing on-line searching, and particularly, to searching with face recognition and social networking profiles. In one example, one or more systems may be provided with regard to searching with face recognition and social networking profiles.

17 Claims, 6 Drawing Sheets

(56) References Cited

U.S. PATENT DOCUMENTS

| | | | |
|---|---|---|---|
| 2008/0292299 A1 | 11/2008 | Kretz et al. | |
| 2008/0317298 A1* | 12/2008 | Shah et al. | 382/118 |
| 2009/0060289 A1* | 3/2009 | Shah et al. | 382/118 |
| 2009/0119167 A1 | 5/2009 | Kendall et al. | |
| 2009/0141993 A1 | 6/2009 | Ma et al. | |
| 2009/0169067 A1 | 7/2009 | Chang et al. | |
| 2009/0234842 A1 | 9/2009 | Luo et al. | |
| 2009/0245573 A1 | 10/2009 | Saptharishi et al. | |
| 2009/0280859 A1 | 11/2009 | Bergh | |
| 2009/0285488 A1 | 11/2009 | Li | |
| 2010/0063993 A1 | 3/2010 | Higgins et al. | |
| 2010/0076850 A1 | 3/2010 | Parekh et al. | |
| 2010/0076851 A1 | 3/2010 | Jewell, Jr. | |
| 2010/0135584 A1 | 6/2010 | Tang et al. | |
| 2010/0158371 A1 | 6/2010 | Jung et al. | |
| 2010/0162175 A1 | 6/2010 | Lee et al. | |
| 2010/0177938 A1* | 7/2010 | Martinez et al. | 382/118 |
| 2010/0205242 A1 | 8/2010 | Marchioro, II et al. | |
| 2010/0241658 A1 | 9/2010 | Rathurs et al. | |
| 2010/0257023 A1 | 10/2010 | Kendall et al. | |
| 2010/0272363 A1 | 10/2010 | Steinberg et al. | |
| 2010/0281113 A1* | 11/2010 | Laine et al. | 709/204 |
| 2010/0287053 A1 | 11/2010 | Ganong et al. | |
| 2011/0013810 A1 | 1/2011 | Engstrom et al. | |
| 2011/0016476 A1 | 1/2011 | Raju | |
| 2011/0085710 A1 | 4/2011 | Perlmutter et al. | |
| 2011/0296004 A1 | 12/2011 | Swahar | |
| 2012/0054691 A1 | 3/2012 | Nurmi | |
| 2012/0110071 A1 | 5/2012 | Zhou et al. | |
| 2012/0158720 A1* | 6/2012 | Luan et al. | 707/732 |
| 2012/0310674 A1* | 12/2012 | Faulkner et al. | 705/3 |
| 2012/0330995 A1 | 12/2012 | Muenkel | |
| 2013/0007149 A1 | 1/2013 | Harris | |
| 2013/0060868 A1* | 3/2013 | Davis et al. | 709/206 |
| 2013/0121540 A1* | 5/2013 | Garcia et al. | 382/118 |
| 2013/0141434 A1 | 6/2013 | Sugden et al. | |
| 2013/0298030 A1 | 11/2013 | Nahumi et al. | |
| 2014/0101145 A1* | 4/2014 | Alonso et al. | 707/728 |

OTHER PUBLICATIONS

Kumar et al., "Describale Visual Attributes for Face Verification and Image Search", IEEE Transactions on, vol. PP, Issue 99, Mar. 10, 2011, pp. 1-17.

http://www.tlc2.uh.edu/swtc/RnD/RD_Projects/facial_recognition/, "Automatic Facial Recognition for Monitoring Ingress and Egress", Southwest Public Safety Technology Center, Printed Jul. 20, 2011.

http://en.wikipedia.org/wiki/Facial_recognition_system, "Facial recognition system", Printed Jul. 20, 2011.

http://en.wikipedia.org/wiki/Friend_(Facebook), "Friend (Facebook)", Printed Jul. 12, 2011.

http://en.wikipedia.org/wiki/Social_network_service, "Social Networking Service", Printed Jul. 12, 2011.

http://en.wikipedia.org/wiki/List_of_social_networking_websites, "List of social networking websites", Printed Jul. 12, 2011.

http://www.facedetection.com/facedetection/techniques.htm, "Techniques", Printed Aug. 17, 2011.

http://en.wikipedia.org/wiki/Augmented_reality, "Augmented reality", Printed Jul. 28, 2011.

Kim, I., et al., "Face Detection", Face Detection Project, EE368, Stanford University, May 2003, pp. 1-32.

Hachman, M., "Google's New Google+ Social Network: Hands on", http://www.pcmag.com/print_article2/0,1217,a=266294.asp?hidPrint=true, Jun. 28, 2011, Ziff Davis Inc.

Albanesius, C., "Google+ Users: 20 Million by the Weekend?", http://www.pcmag.com/print_article2/0,1217,a=266738,00.asp?hidPrint=true, Jul. 12, 2011, Ziff Davis Inc.

http://en.wikipedia.org/w/index.php?oldid=440146546, "Face Detection", Last Modified Jul. 18, 2011.

United States Official Action dated May 20, 2014 received in related U.S. Appl. No. 13/455,658.

United States Official Action dated Nov. 27, 2013 received in related U.S. Appl. No. 13/455,658.

United States Official Action (Interview Summary) dated Feb. 21, 2014 received in related U.S. Appl. No. 13/455,658.

United States Official Action dated Oct. 17, 2014 received in related U.S. Appl. No. 13/455,658.

Saptharishi et al., "An Information Value Driven Architecture for Urban Video Surveillance in Data and Attention Bandwidth Constrained Environments" (2009) Advanced Video and Signal Based Surveillance; IEEE pp. 122-127.

* cited by examiner

SEARCHING WITH FACE RECOGNITION AND SOCIAL NETWORKING PROFILES

BACKGROUND

The present disclosure relates generally to on-line searching systems, and particularly, to searching with face recognition and social networking profiles.

DESCRIPTION OF RELATED ART

Various face detection and image searching patent-related documents have been published. These include the following: United States Patent Application Publication 2009/0234842 in the name of Luo et al., entitled IMAGE SEARCH USING FACE DETECTION; United States Patent Application Publication 2010/0135584 in the name of Tang et al., entitled IMAGE-BASED FACE SEARCH; and United States Patent Application Publication 2010/0272363 in the name of Steinberg et al., entitled FACE SEARCHING AND DETECTION IN A DIGITAL IMAGE ACQUISITION SYSTEM.

SUMMARY

In one embodiment a computer-implemented system for interacting with a social networking service using a mobile device, wherein the social networking service has associated therewith a plurality of member profiles corresponding to a respective plurality of members, wherein each of the member profiles includes at least one member descriptor associated with a respective member, wherein each of the member profiles includes at least one member image associated with a respective member, wherein each member image includes a representation of a face of the respective member, and wherein the mobile device includes at least a camera and a screen (e.g., a display screen and/or a touch screen) is provided, the system comprising: a search service associated with the social networking service; an application associated with the mobile device, wherein the application is in operative communication with the camera, wherein the application provides a user interface, wherein the application receives from the user interface at least one search term, wherein the application receives from the camera at least one source image, and wherein the source image includes a plurality of representations of a plurality of faces; and an Internet access mechanism associated with the mobile device, wherein the Internet access mechanism is in operative communication with the application and wherein the Internet access mechanism provides at least the search term and at least some of the representations of the faces in of the source image to the search service; wherein the search service is in operative communication with the social networking service, wherein the search service compares the search term to at least some of the member descriptors; wherein the search service compares at least one of the representations of the faces in the source image to at least some of the representations of the faces in the member images, and wherein the search service provides at least one result identifying at least one member who has: (a) a member descriptor that is a match to the search term; and (b) a member image including a representation of a face that is a match to a representation of a face in the source image; wherein the search service sends the result back to the mobile device via at least the Internet access mechanism of the mobile device; and wherein the result that is sent back to the mobile device is displayed on the screen (e.g., a display screen and/or a touch screen) of the mobile device by augmenting the source image with at least one indicium identifying the at least one member who has: (a) a member descriptor that is a match to the search term; and (b) a member image including a representation of a face that is a match to a representation of a face in the source image.

In another embodiment a computer-implemented system for interacting with a social networking service using a mobile device, wherein the social networking service has associated therewith a plurality of member profiles corresponding to a respective plurality of members, wherein each of the member profiles includes at least one member image associated with a respective member, wherein each member image includes a representation of a face of the respective member, and wherein the mobile device includes at least a camera and a screen (e.g., a display screen and/or a touch screen) is provided, the system comprising: a search service associated with the social networking service; an application associated with the mobile device, wherein the application is in operative communication with the camera, wherein the application provides a user interface, wherein the application receives from the user interface at least one friend identifier, wherein the application receives from the camera at least one source image, and wherein the source image includes a plurality of representations of a plurality of faces; and an Internet access mechanism associated with the mobile device, wherein the Internet access mechanism is in operative communication with the application and wherein the Internet access mechanism provides at least the friend identifier and at least some of the representations of the faces in the source image to the search service; wherein the search service is in operative communication with the social networking service, wherein the search service compares at least one of the representations of the faces in the source image to at least some of the representations of the faces in the member images associated with members who are indicated in the social networking service as friends of the member identified by the friend identifier, and wherein the search service provides at least one result identifying at least one member who is indicated in the social networking service as a friend of the member identified by the friend identifier and who has a member image including a representation of a face that is a match to a representation of a face in the source image; wherein the search service sends the result back to the mobile device via at least the Internet access mechanism of the mobile device; and wherein the result that is sent back to the mobile device is displayed on the screen (e.g., a display screen and/or a touch screen) of the mobile device by augmenting the source image with at least one indicium identifying the at least one member who is indicated in the social networking service as a friend of the member identified by the friend identifier and who has a member image including a representation of a face that is a match to a representation of a face in the source image.

In another embodiment a computer-implemented system for interacting with a social networking service using a mobile device, wherein the social networking service has associated therewith a plurality of member profiles corresponding to a respective plurality of members, wherein at least one of the member profiles includes advertisement information associated with a respective member, wherein each of the member profiles includes at least one member image associated with a respective member, wherein each member image includes a representation of a face of the respective member, and wherein the mobile device includes at least a camera and a screen (e.g., a display screen and/or a touch screen) is provided, the system comprising: a search service associated with the social networking service; an application associated with the mobile device, wherein the application is in operative communication with the camera, wherein the application provides a user interface, wherein the application receives from the camera at least one source image, and wherein the source image includes a plurality of representations of a plurality of faces; and an Internet access mechanism associated with the mobile device, wherein the Internet access mechanism is in operative communication with the application and wherein the Internet access mechanism provides at least some of the representations of the faces in the source image to the search service; wherein the search service is in operative communication with the social networking service, wherein the search service compares at least one of the representations of the faces in the source image to at least some of the representations of the faces in the member images, and wherein the search service provides at least one result identifying at least one member who has a member image including a representation of a face that is a match to a representation of a face in the source image; wherein the search service sends the result back to the mobile device via at least the Internet access mechanism of the mobile device; and wherein the search service sends at least some of the advertisement information associated with the member who has a member image including a representation of a face that is a match to a representation of a face in the source image back to the mobile device via at least the Internet access mechanism of the mobile device.

BRIEF DESCRIPTION OF THE DRAWINGS

Various objects, features and advantages of the present invention will become apparent to one skilled in the art, in view of the following detailed description taken in combination with the attached drawings, in which.

DETAILED DESCRIPTION

In one example, one or more systems may be provided with regard to searching with face recognition and social networking profiles.

In another example, one or more methods may be provided with regard to searching with face recognition and social networking profiles.

For the purposes of describing and claiming the present invention the term "social networking service" is intended to refer to an online service, platform or website that: (a) focuses on building, among a plurality of people, social network(s) and/or social relationship(s); (b) focuses on reflecting, as to a plurality of people, social network(s) and/or social relationship(s); and/or (c) includes a database containing, for each member of the database, at least a photograph and a profile containing descriptive information. In various examples, a social networking service as applied to an embodiment of the present invention may be selected from the group including (but not limited to): GOOGLE+, GOOGLE BUZZ, FACEBOOK, TWITTER, FOURSQUARE, LINKEDIN and FLICKR.

For the purposes of describing and claiming the present invention the term "mobile device" is intended to refer to any generally portable device having network access (e.g. Internet access) and including a camera mechanism. In various examples, a mobile device as applied to embodiments of the present invention may be selected from the group including (but not limited to): a mobile phone (e.g., a "smart phone" or a "feature phone"), a tablet (e.g., an iPad), a PDA (personal digital assistant), and a dedicated camera (including network access). Of note, such network access may be available to the mobile device wirelessly and/or through a wired mechanism (such a wired mechanism may include a removable plug or the like, so that portability is maintained).

For the purposes of describing and claiming the present invention the term "search service" is intended to refer to an online service, platform or website that: provides the search functionality described herein. In various examples, such a search service may comprise: (a) computer software; (b) computer hardware; (c) computer firmware; and/or (d) a combination thereof.

For the purposes of describing and claiming the present invention the term "application" (such as used in the context of an application associated with a mobile device) is intended to refer to a mechanism that provides the functionality described herein. In various examples, such an application may comprise: (a) computer software; (b) computer hardware; (c) computer firmware; and/or (d) a combination thereof.

For the purposes of describing and claiming the present invention the term "camera" (such as used in the context of a camera included with a mobile device) is intended to refer to a mechanism that provides still image capture and/or video image capture.

For the purposes of describing and claiming the present invention the term "Internet access" is intended to refer to the ability to connect (e.g., bi-directionally) with the Internet. In various examples Internet access as applied to embodiments of the present invention may be selected from the group including (but not limited to): access via Wi-Fi, access via Bluetooth, access via a cell phone network (e.g., a 2G network, a 3G network, or a 4G network), and access via a wired mechanism (such a wired mechanism may include a removable plug or the like, so that portability is maintained).

For the purposes of describing and claiming the present invention the term "friend" is intended to refer to a member of a social networking service who has indicated a willingness to be identified as such with respect to another person or persons.

For the purposes of describing and claiming the present invention the term "friend identifier" is intended to refer to an indication identifying a person's social networking service friend.

For the purposes of describing and claiming the present invention the term "friend level indicator" is intended to refer to how many search iterations regarding friends-of-friends are to be performed (for example, a friend level indicator of 2 would mean that a search should encompass friends as well as friends-of-friends; in another example, a friend level indicator of 3 would mean that a search should encompass friends, friends-of-friends, as well as friends-of-friends-of-friends).

For the purposes of describing and claiming the present invention the term "representation of a face" is intended to refer to a representation of all or part of a face.

For the purposes of describing and claiming the present invention the term "approximate match within a degree of confidence" is intended to refer to a facial recognition match that is not an exact match but that is deemed a match by meeting certain parameters defined by a facial recognition algorithm. In one example, an approximate match within a degree of confidence may be found by comparing selected facial features. In another example, an approximate match within a degree of confidence may depend upon factors including (but not limited to) the following parameters: appearance of facial hair and/or accessories such as glasses etc.

In one embodiment a computer-implemented system for interacting with a social networking service using a mobile device, wherein the social networking service has associated therewith a plurality of member profiles corresponding to a respective plurality of members, wherein each of the member profiles includes at least one member descriptor associated with a respective member, wherein each of the member profiles includes at least one member image associated with a respective member, wherein each member image includes a representation of a face of the respective member, and wherein the mobile device includes at least a camera and a screen (e.g., a display screen and/or a touch screen) is provided, the system comprising: a search service associated with the social networking service; an application associated with the mobile device, wherein the application is in operative communication with the camera, wherein the application provides a user interface, wherein the application receives from the user interface at least one search term, wherein the application receives from the camera at least one source image, and wherein the source image includes a plurality of representations of a plurality of faces; and an Internet access mechanism associated with the mobile device, wherein the Internet access mechanism is in operative communication with the application and wherein the Internet access mechanism provides at least the search term and at least some of the representations of the faces in the source image to the search service; wherein the search service is in operative communication with the social networking service, wherein the search service compares the search term to at least some of the member descriptors; wherein the search service compares at least one of the representations of the faces in the source image to at least some of the representations of the faces in the member images, and wherein the search service provides at least one result identifying at least one member who has: (a) a member descriptor that is a match to the search term; and (b) a member image including a representation of a face that is a match to a representation of a face in the source image; wherein the search service sends the result back to the mobile device via at least the Internet access mechanism of the mobile device; and wherein the result that is sent back to the mobile device is displayed on the screen (e.g., a display screen and/or a touch screen) of the mobile device by augmenting the source image with at least one indicium identifying the at least one member who has: (a) a descriptor that is a match to the search term; and (b) a member image including a representation of a face that is a match to a representation of a face in the source image.

In one example: the search service may provide at least a first result identifying at least a first member who has: (a) a descriptor that is a match to the search term from the mobile device; and (b) a member image including a representation of a face that is a match to a first one of the representation of faces in the source image; and the search service may provide at least a second result identifying at least a second member who has: (a) a member descriptor that is a match to the search term from the mobile device; and (b) a member image including a representation of a face that is a match to a second one of the representation of faces in the source image.

In another example: the first result that is sent back to the mobile device may be displayed on the screen (e.g., a display screen and/or a touch screen) of the mobile device by augmenting the source image with at least a first indicium identifying the first member; and the second result that is sent back to the mobile device may be displayed on the screen (e.g., a display screen and/or a touch screen) of the mobile device by augmenting the source image with at least a second indicium identifying the second member.

In another example, the search service may be integrated into the social networking service.

In another example, a member descriptor that is a match to the search term from the mobile device may be an essentially exact match to the search term.

In another example, a member descriptor that is a match to the search term from the mobile device may be a match to the search term that is an approximate match within a degree of confidence.

In another example, a representation of a face in a member image that is a match to a representation of a face in the source image may be an essentially exact match.

In another example, a representation of a face in a member image that is a match to a representation of a face in the source image may be an approximate match within a degree of confidence. In another example, a user may have an option to change a "degree of confidence level" (e.g., a user may change a % age match from 100% to 75% match etc.).

In another example, the present invention may utilize any conventional facial detection/recognition software and/or algorithms.

In another example, the search term may comprise a plurality of search terms.

In another example, the mobile device may be selected from the group including (but not limited to): (a) a mobile phone, (b) a tablet, (c) a PDA, and (d) a dedicated camera, video or like image capture device.

In one embodiment a computer-implemented system for interacting with a social networking service using a mobile device, wherein the social networking service has associated therewith a plurality of member profiles corresponding to a respective plurality of members, wherein each of the member profiles includes at least one member image associated with a respective member, wherein each member image includes a representation of a face of the respective member, and wherein the mobile device includes at least a camera and a screen (e.g., a display screen and/or a touch screen) is provided, the system comprising: a search service associated with the social networking service; an application associated with the mobile device, wherein the application is in operative communication with the camera, wherein the application provides a user interface, wherein the application receives from the user interface at least one friend identifier, wherein the application receives from the camera at least one source image, and wherein the source image includes a plurality of representations of a plurality of faces; and an Internet access mechanism associated with the mobile device, wherein the Internet access mechanism is in operative communication with the application and wherein the Internet access mechanism provides at least the friend identifier and at least some of the representations of the faces in the source image to the search service; wherein the search service is in operative communication with the social networking service, wherein the search service compares at least one of the representations of the faces in the source image to at least some of the representations of the faces in the member images associated with members who are indicated in the social networking service as friends of the member identified by the friend identifier, and wherein the search service provides at least one result identifying at least one member who is indicated in the social networking service as a friend of the member identified by the friend identifier and who has a member image including a representation of a face that is a match to a representation of a face in the source image; wherein the search service sends the result back to the mobile device via at least the Internet access mechanism of the mobile device; and wherein the result that is sent back to the mobile device is displayed on the screen (e.g., a display screen and/or a touch screen) of the mobile device by augmenting the source image with at least one indicium identifying the at least one member who is indicated in the social networking service as a friend of the member identified by the friend identifier and who has a member image including a representation of a face that is a match to a representation of a face in the source image.

In one example: the search service may provide at least a first result identifying at least a first member who is indicated in the social networking service as a friend of the member identified by the friend identifier and who has a member image including a representation of a face that is a match to a representation of a face in the source image; and the search service may provide at least a second result identifying at least a second member who is indicated in the social networking service as a friend of the member identified by the friend identifier and who has a member image including a representation of a face that is a match to a representation of a face in the source image.

In another example: the first result that is sent back to the mobile device may be displayed on the screen (e.g., a display screen and/or a touch screen) of the mobile device by augmenting the source image with at least a first indicium identifying the first member; and the second result that is sent back to the mobile device may be displayed on the screen (e.g., a display screen and/or a touch screen) of the mobile device by augmenting the source image with at least a second indicium identifying the second member.

In another example, the search service may be integrated into the social networking service.

In another example, a representation of a face in a member image that is a match to a representation of a face in the source image may be an essentially exact match.

In another example, a representation of a face in a member image that is a match to a representation of a face in the source image may be an approximate match within a degree of confidence.

In another example, the friend identifier may comprise a plurality of friend identifiers.

In another example: the application may further receive from the user interface a friend level indicator; and the search service may perform iterative searching of friends-of-friends based at least in part upon the friend level indicator and the friend identifier.

In another example, the mobile device may be selected from the group including (but not limited to): (a) a mobile phone, (b) a tablet, (c) a PDA, and (d) a dedicated camera, video or like image capture device.

In another embodiment a computer-implemented system for interacting with a social networking service using a mobile device, wherein the social networking service has associated therewith a plurality of member profiles corresponding to a respective plurality of members, wherein at least one of the member profiles includes advertisement information associated with a respective member, wherein each of the member profiles includes at least one member image associated with a respective member, wherein each member image includes a representation of a face of the respective member, and wherein the mobile device includes at least a camera and a screen (e.g., a display screen and/or a touch screen) is provided, the system comprising: a search service associated with the social networking service; an application associated with the mobile device, wherein the application is in operative communication with the camera, wherein the application provides a user interface, wherein the application receives from the camera at least one source image, and wherein the source image includes a plurality of representations of a plurality of faces; and an Internet access mechanism associated with the mobile device, wherein the Internet access mechanism is in operative communication with the application and wherein the Internet access mechanism provides at least some of the representations of the faces in the source image to the search service; wherein the search service is in operative communication with the social networking service, wherein the search service compares at least one of the representations of the faces in the source image to at least some of the representations of the faces in the member images, and wherein the search service provides at least one result identifying at least one member who has a member image including a representation of a face that is a match to a representation of a face in the source image; wherein the search service sends the result back to the mobile device via at least the Internet access mechanism of the mobile device; and wherein the search service sends at least some of the advertisement information associated with the member who has a member image including a representation of a face that is a match to a representation of a face in the source image back to the mobile device via at least the Internet access mechanism of the mobile device.

In one example, at least one of the result and the advertisement information that are sent back to the mobile device may be displayed on a screen (e.g., a display screen and/or a touch screen) of the mobile device.

In another example, the search service may be integrated into the social networking service.

In another example, a representation of a face in a member image that is a match to a representation of a face in the source image may be an essentially exact match.

In another example, a representation of a face in a member image that is a match to a representation of a face in the source image may be an approximate match within a degree of confidence.

In another example, the mobile device may be selected from the group including (but not limited to): (a) a mobile phone, (b) a tablet, (c) a PDA, and (d) a dedicated camera, video or like image capture device.

In another embodiment a method for interacting with a social networking service using a mobile device, wherein the social networking service has associated therewith a plurality of member profiles corresponding to a respective plurality of members, wherein each of the member profiles includes at least one member descriptor associated with a respective member, wherein each of the member profiles includes at least one member image associated with a respective member, wherein each member image includes a representation of a face of the respective member, and wherein the mobile device includes at least a camera and a screen (e.g., a display screen and/or a touch screen) is provided, the method comprising: receiving at a search service, from the mobile device, at least one search term and at least one source image, wherein the source image includes a plurality of representations of a plurality of faces; comparing, using the search service, the search term to at least some of the member descriptors; comparing, using the search service, at least one of the representations of the faces in the source image to at least some of the representations of the faces in the member images; and sending back to the mobile device, from the search service, at least one result identifying at least one member who has: (a) a member descriptor that is a match to the search term; and (b) a member image including a representation of a face that is a match to a representation of a face in the source image; wherein the result that is sent back to the mobile device is used to display on the screen (e.g., a display screen and/or a touch screen) of the mobile device by an augmented source image with at least one indicium identifying the at least one member who has: (a) a member descriptor that is a match to the search term; and (b) a member image including a representation of a face that is a match to a representation of a face in the source image. In one example, the mobile device produces the augmented source image based upon the original source image and the result that is sent back to the mobile device. In another example, the result that is sent back to the mobile device includes the augmented source image from the search service (in this example, the search service may produce the augmented source image based upon the original source image that is provided to the search service from the mobile device).

Figure 1:
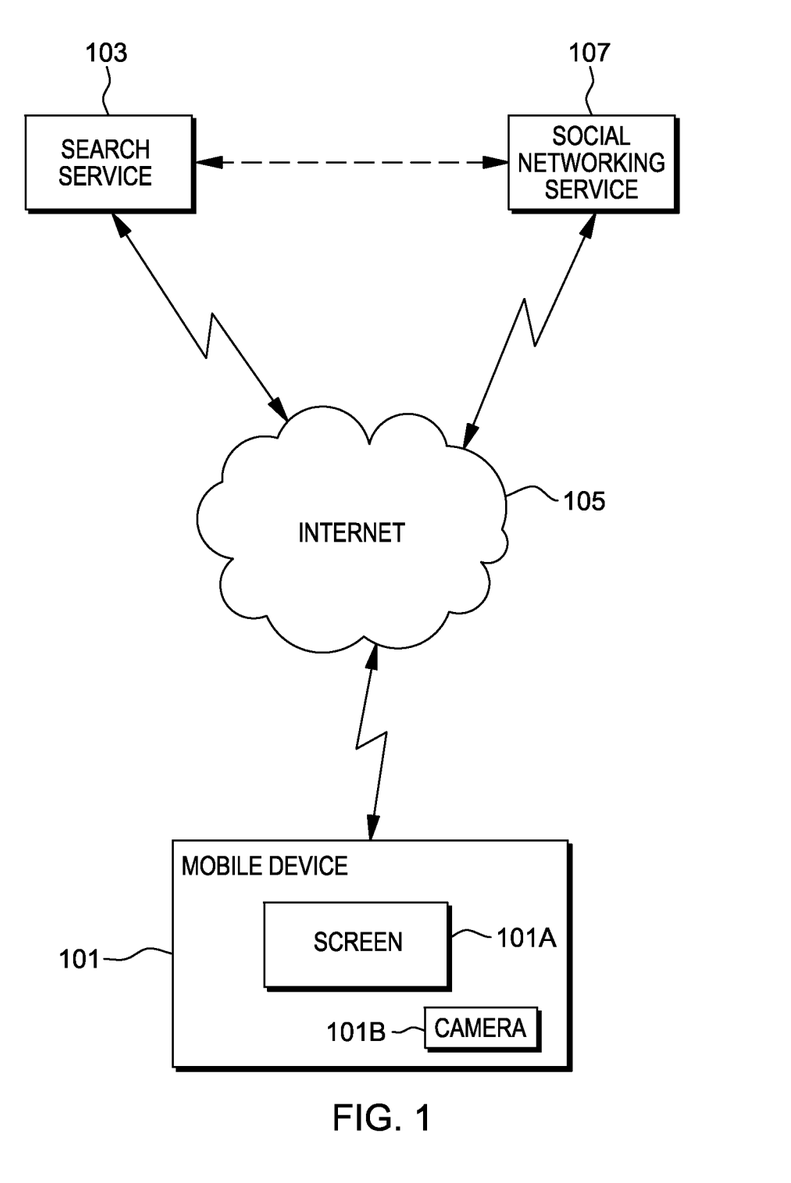
FIG. 1 depicts a block diagram of a system according to one embodiment of the present invention.

Referring now to FIG. 1, a block diagram according to one embodiment of the present invention is shown. As seen in this FIG. 1, mobile device 101 may communicate (e.g., bi-directionally) with Search Service 103 via Internet 105. In one example, mobile device 101 may include a display device screen 101A and Camera 101B. In one example, Search Service 103 may be a website, one or more server computers, and/or other mechanism for providing various search functionality as described herein. Further, Search Service 103 may communicate (e.g., bi-directionally) with Social Networking Service 107 via Internet 105. In one example, Social Networking Service 107 may be a website, one or more server computers, and/or other mechanism for providing various social networking service functionality. In another example, Search Service 103 may communicate (e.g., bi-directionally) with Social Networking Service 107 via a private communication channel (e.g., private network). Such private communication channel (shown in FIG. 1 as a dashed line) may supplement or replace the Internet communication between Search Service 103 and Social Networking Service 107.

Figure 2:
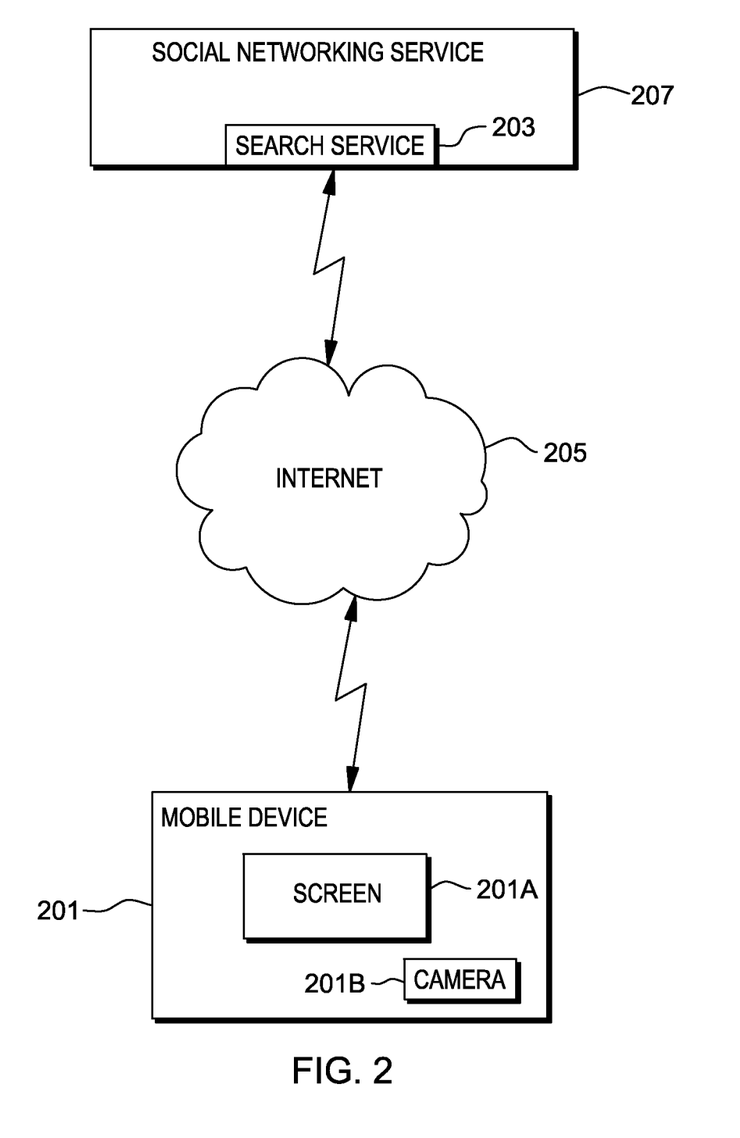
FIG. 2 depicts a block diagram of a system according to another embodiment of the present invention.

Referring now to FIG. 2, a block diagram according to another embodiment of the present invention is shown. As seen in this FIG. 2, mobile device 201 may communicate (e.g., bi-directionally) with Search Service 203 via Internet 205. In one example, mobile device 201 may include screen 201A and Camera 201B. The system of this FIG. 2 is similar to the system of FIG. 1, with the main difference being that in the system of this FIG. 2, Search Service 203 may be integrated with Social Networking Service 207 (e.g., Search Service 203 and Social Networking Service 207 may be a website, one or more server computers, and/or other mechanism for providing various social networking service and search functionality described herein).

Figure 3:
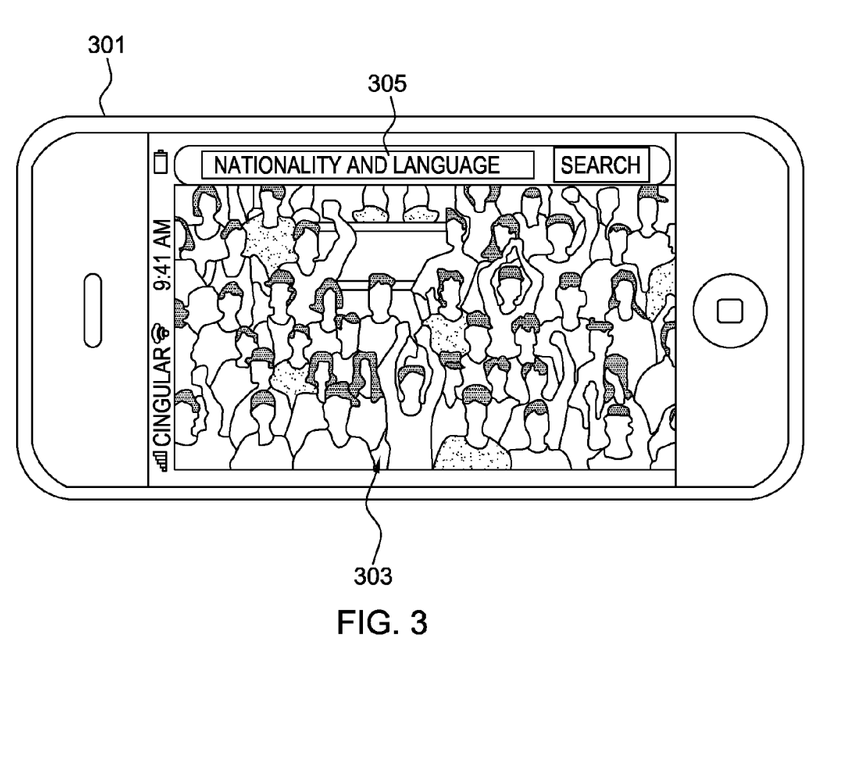
FIG. 3 depicts a mobile device and application according to another embodiment of the present invention.
Figure 4:
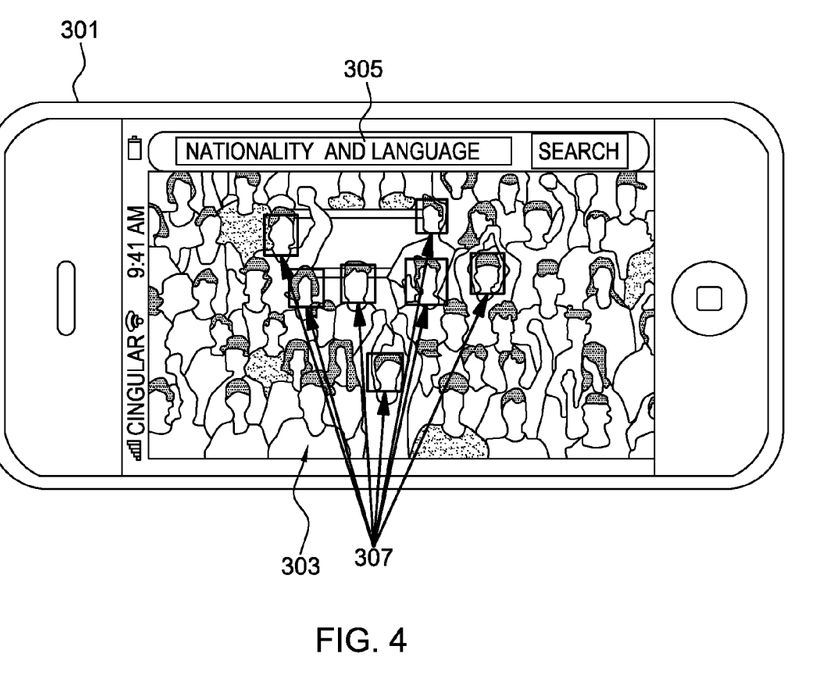
FIG. 4 depicts again the mobile device and application of FIG. 3.
Figure 5:
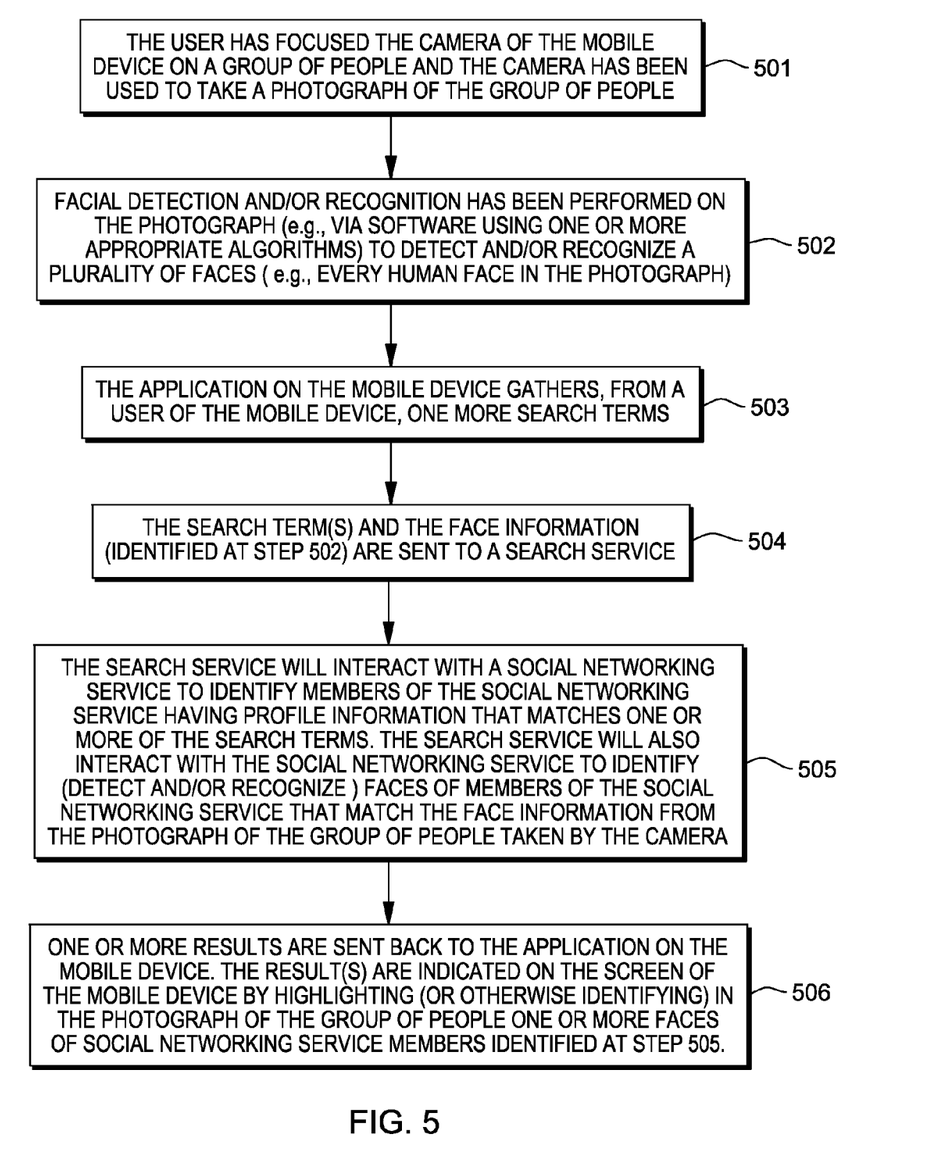
FIG. 5 depicts a flow chart relating to FIGS. 3 and 4.

Reference will now be made to FIGS. 3-5. FIGS. 3 and 4 show a mobile device and application according to an embodiment of the present invention. In one example, the mobile device may be a phone. FIG. 5 shows a flowchart depicting the methodology for the social networking service interaction according to one embodiment that is associated with the mobile device and application of FIGS. 3 and 4. As seen in these Figs, mobile device 301 may have associated therewith a screen 303 (in various examples, screen 303 may be a display screen or a touch screen). Further, mobile device 301 may have associated therewith a camera.

As seen in FIGS. 3 and 4, and as described at step 501 of FIG. 5, the user has focused the camera of the mobile device on a group of people and the camera has been used to take a photograph of the group of people—the photograph is shown on the screen 303 (this embodiment will be described with reference to the camera taking a single still digital image or photograph; in other examples, the camera may be a video camera and the resultant video stream (or portion thereof) may be used essentially as described herein in place of the single still photograph).

Next, at step 502 of FIG. 5, facial detection has been performed on the photograph (e.g., via facial detection software using one or more appropriate algorithms) to detect a plurality of faces (e.g., every human face in the photograph). In this example, the facial detection is carried out at the mobile device. In another example, the source image may be sent from the mobile device to the search service to carry out the facial detection at the search service.

Next, at step 503 of FIG. 5, the application on the mobile device gathers, from a user of the mobile device, one more search terms (this may be carried out, for example, via the user interface 305 seen in FIGS. 3 and 4). In one example, the user may be presented with a text box (or the like) to type in one or more search terms and the user may be presented with a search button (or the like) to initiate searching. In the example shown in these Figs. (which example is intended to be illustrative and not restrictive), the two search terms such as specific Nationality and specific Language have been entered by the user. In another example, Boolean AND operators may applied to the search terms to generate the "search term matches" (see step 505 carried out by the Search Service below). In another example, Boolean OR operators may be applied to the search terms to generate the "search term matches" (see step 505 carried out by the Search Service below). In another example, Boolean NOT operators may be applied to the search terms to generate the "search term matches" (see step 505 carried out by the Search Service below). In another example, Boolean NAND operators may be applied to the search terms to generate the "search term matches" (see step 505 carried out by the Search Service below). In another example, Boolean NOR operators may be applied to the search terms to generate the "search term matches" (see step 505 carried out by the Search Service below). In another example, Boolean XOR operators may be applied to the search terms to generate the "search term matches" (see step 505 carried out by the Search Service below).

Next, at step 504 of FIG. 5, the search term(s) and the face information (identified at step 502) are sent to a Search Service (see, e.g., Search Service 103 of FIG. 1 or Search Service 203 of FIG. 2).

Next, at step 505 of FIG. 5, the Search Service will interact with a Social Networking Service (see, e.g., Social Networking Service 107 of FIG. 1 or Social Networking Service 207 of FIG. 2) to identify members of the Social Networking Service having profile information that matches one or more of the search terms (in this example, Nationality and Language)—these matches may be referred to as "search term matches". The Search Service will also interact with the Social Networking Service to identify faces of members of the Social Networking Service that match the face information from the image or photograph of the group of people taken by the camera—these matches may be referred to as "face matches." In one example, the search term comparison may be done first, to minimize the size of the set of test data for the facial identification aspect. In another example, the search term comparison may be done after the facial identification aspect. In another example, the search term comparison may be done essentially in parallel with the facial identification aspect.

Next, at step 506 of FIG. 5, one or more results may be sent back to the application on the mobile device. In one example, the results may reflect a set of Boolean "search term matches" AND "face matches" (wherein the results comprise face matches for members having profile information matching one or more search terms). In another example, the result(s) may be indicated on the screen 303 of the mobile device 301 by highlighting (or otherwise identifying) in the image or photograph of the group of people one or more faces (see 307 of FIG. 4) of social networking service members identified at step 505.

In one example, the Search Service will interact with the Social Networking Service using facial recognition software and/or algorithms to identify faces of members of the Social Networking Service that match the face information from the photograph of the group of people taken by the camera.

In another example, the mobile device will detect face(s) in an original image, the mobile device will store the original image, the mobile device will send one or more search terms along with face information describing the detected face(s) to a Search Service, the Search Service will return one or more results as described herein, and the mobile device will augment (based on the returned results) the original image as described herein. In one specific example, the face information describing the detected face(s) may be in the form of metadata. In another specific example, the returned results may be in the form of metadata.

In another example, the mobile device sends one or more search terms along with an original image to a Search Service and the Search Service returns one or more results as described herein. In one specific example, the returned results may be in the form of an augmented original image with one or more faces highlighted (or otherwise identified).

In another example, the Search Service may interact with the Social Networking Service to perform the "search term matches" as follows:
1. User provides any search term with AND . . . OR condition, following is one specific example: "Doctor" AND "Spanish" AND "Gold Medalists." This may be a free text keyword.
2. Once any mobile device (e.g., phone) software (using camera) detects any one or more human faces, then the identified faces will be searched in the Social Networking Service (e.g., Facebook, LinkedIn, etc).
3. Once the faces are identified in the Social Networking Service then based on the text search criteria, the software will search the profile of each identified person (Faces).
4. In a social network profile setting, a user may have provided his education, language known, profession etc. So the search will be performed in the user profile.
5. Once the software identifies any such matching criteria, the appropriate faces will be highlighted on the mobile device screen.

So, in the above example of "search term matches", a user profile (with given search criteria) will be searched for the identified faces.

In another example, the Search Service may interact with the Social Networking Service to perform the "face matches" as follows:
While creating any social network profile, user uploads his photograph.
In this case, there can be a validation method in the Social Networking Service while creating the user profile. For example, while creating the user profile, a web cam installed in the computer will capture the photograph of the user, and a digital photo ID card can be scanned to create user profile. Once the person is recognized, then software will use that face to identify the person uniquely. This Face information can be different from that of the profile photo. This face information may be used for identifying any person uniquely.

Now, once any human face is identified by the mobile device (e.g., phone), then the identified human face will be searched against the user's photograph in the Social Networking Service as mentioned above. This is refers "face matches"

In another example, any programming language which can perform internet search can be used. For example, C++, Java.

In another example, any platform which supports internet search. (e.g., Android, iPhone) may be utilized.

In another example, a mobile device does the face search (in this example, a database of all faces from the Social Networking Service may be on (or accessible by) the mobile device.

In another example, mobile device sends pictures of faces to the Search Service.

In another example, the faces can be recognized (e.g., at the Search Service side) automatically based on different face detection/recognition methods. Images may be sent to one or more Social Networking Services to find matching faces and/or user profile. In one specific example:
1. Images are analyzed on the mobile device and broken into a set of subimages of individual faces.
2. These individual faces are sent from the mobile device to the Search Service/Social Networking Service for potential recognition
3. The Search Service/Social Networking Service compares each of the individual faces to compare for matches vs the profile faces stored on the Social Networking Service (e.g., Social Networking Service profile server).
4. Every individual face image search request is responded to from the Search Service/Social Networking Service server. Matching faces are identified and profile information is retrieved from the Social Networking Service profile server. Non-matching faces get a response indicating there is no profile information.
5. Results are sent back to the mobile device.

In various examples, any desired face detection and/or recognition methods known by those of ordinary skill in the art may be utilized. Specific examples include (but are not limited to) the following (each of the following documents is incorporated herein by reference in its entirety): (a) http://www.facedetection.com/facedetection/techniques.htm; (b) http://www.stanford.edu/class/ee368/Project_03/Project/reports/ee368group02.pdf ("face Detection" by Kim, Shim and Yang); (c) http://en.wikipedia.org/wiki/Face_detection; (d) "http://www.tlc2.uh.edu/swtc/RnD/RD_Projects/facial_recognition/; and (e) http://en.wikipedia.org/wiki/Facial_recognition_system.

In another example, the form of the data in the results (that are returned to the mobile device) that enables the mobile device to augment the original image may include (but not be limited to) one or more of the following:
Based on the search criteria, faces with specified criteria may be identified. And the faces may be highlighted (e.g., with block or other indicium). Further, advertisement or any other information may be displayed (e.g., over the identified face).

In another example, profile info that is accessible (e.g., based on the security level of the requestor) like telephone numbers, occupation, email/SMS info, address, friend level could be returned to be viewed and/or used to call, SMS and/or email the person. Also the indicia could, based on the friend level, have a different block highlighting, shading or the like.

In another example, the format of the data could be an XML Tag/Value type of format so that the type of information and value are clearly identified.

In another example, a mobile device may correlate the results that are returned to the faces in the original image by a mechanism or process that may include (but not be limited to) one or more of the following:

In one example, the faces may be identified based on the user's profile search. In another example, some identified advertisements may (also) be displayed along with the identified faces.

For example, once advertisement or other information is identified against any face, then automatically the system knows whose information relates, and then augments the result. This is one example correlation.

In another example, the image (e.g., the original image) is split into individual faces at the mobile device, and each face given a tag before being sent to the Search Service/Social Networking Service. The Search Service/Social Networking Service then responds with the tag number and the results info. That way the info can be easily correlated back to the original image (e.g., for augmentation at the mobile device).

In another example, the mobile device may send the original image (or a copy of the original image) to the Search Service (or to any desired other computer) to detect the faces for the mobile device. In this example, the Search Service (or any desired other computer) may send back to the mobile device an indication of where in the original image each face occurs. The mobile device may then use this information to augment the original image as described herein.

Figure 6:
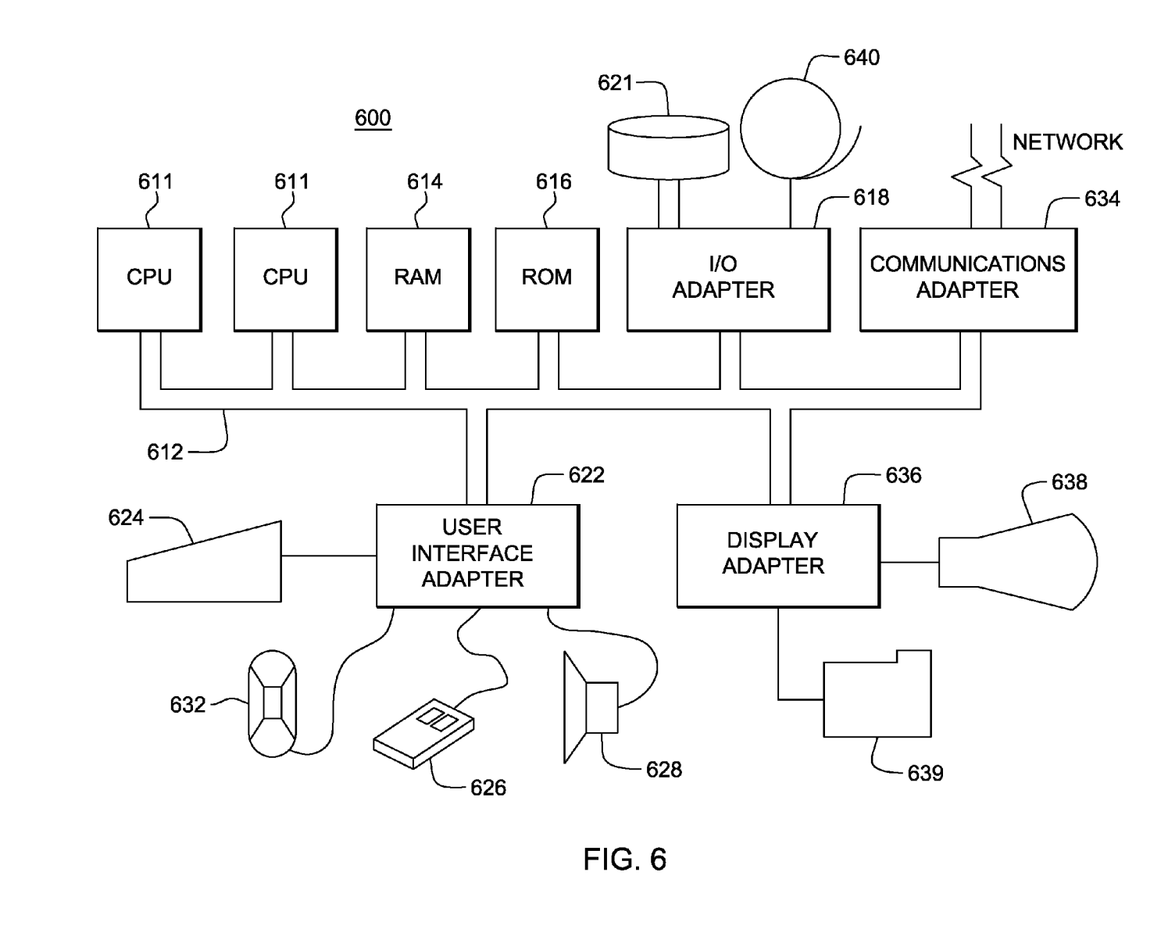
FIG. 6 depicts a block diagram according to another embodiment of the present invention.

Referring now to FIG. 6, this Fig. shows a hardware configuration of computing system 600 according to an embodiment of the present invention. As seen, this hardware configuration has at least one processor or central processing unit (CPU) 611. The CPUs 611 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communications adapter 634 for connecting the system 600 to a data processing network, the Internet, an Intranet, a local area network (LAN), etc., and a display adapter 636 for connecting the bus 612 to a display device 638 and/or printer 639 (e.g., a digital printer or the like).

Reference will now be made to an example use case according to an embodiment of the present invention (of course, this example is intended to be illustrative and not restrictive):

When a person moves to a new location, he or she will often not know anyone. Every face he or she meets is typically an unknown for the person. It can be very difficult for the person to find a particular community or to establish social networking circles. Various embodiments of the present invention may help the new person to establish social networking contacts (in one example, one or more images may be used to find a specific human being from a crowd based on some search criteria).

In this specific example, there is a cricket match between Country "A" and Country "B". A spectator wants to enjoy the cricket match and get a seat in a place where there is a relatively high concentration of Country "A" team fans that speak a specific language. The present invention may provide a way to find this out by linking facial recognition with searches of Social Networking Services that associate a photo of a person with his or her personal data.

As described herein, various embodiments of the present invention may provide for using a mobile phone camera, a PDA, a camera with internet access, or the like to match human faces in a photo with some search criteria. When users of a Social Networking Service containing a suitable facial image provide profile information, this profile information may be searched to find matches for faces in the photo. In two examples (which examples are intended to be illustrative and not restrictive), profile information may be of the type shown in Tables 1 and 2, below (various information may be made available by a Social Networking Service to everyone (e.g., the entire world) or a restricted group of people):

TABLE 1

Language Known
Previous and Current Employers
Native Place
School and College
Likes and Dislikes
Technical Knowledge
Choice of Food
Etc.

TABLE 2

Looking For (e.g., friendship, networking)
Current City
Hometown
Political Views
Religious Views
Favorite Quotation
Language(s) Known
Education and Work
Employers
School (e.g., high school, college, grad school)
Etc.

As described herein, various embodiments of the present invention may provide for one or more of the following:

Enabling a user to use a mobile phone camera to match human faces in a photo with some search criteria.

Sending specific profile search terms (e.g., a specific job or profession and "a specific language or nationality) along with face information (e.g., image(s)) corresponding to one or more people to use to mine data from a social networking service (this technique may sometimes be referred to herein as "Technique 1").

Sending a "friend" level search request (e.g., level 2 to identify "Friends" and "Friends-Of-Friends") along with face information (e.g., image(s)) corresponding to one or more people to use to mine data from a social networking service (this technique may sometimes be referred to herein as "Technique 2").

Sending face information (e.g., image(s)) corresponding a plurality of people in a group photograph along with at least one of: specific profile search terms (see Technique 1 above); and/or a "friend" level search request (see Technique 2 above) and using the search result(s) to augment the original group photo with highlighted matches.

Sending face information (e.g., image(s)) corresponding to one or more people and augmenting the original photo(s) with advertising information based on information from a social networking service.

As described herein, various embodiments of the present invention may provide for advertising as follows:

A social networking service contains user profiles. Associated with at least some of the user profiles are one or more advertisements (in one example, the advertisements may be placed in a dedicated section called "advertisements" or the like). The advertisement(s) may be placed by user(s) desiring to provide information related to their work, the services that they can provide, the products that they can provide or the like. In one specific example (which example is intended to be illustrative and not restrictive), one social networking service user ("User A") may provide advertisement information to the effect that "I sell real estate". In another specific example (which example is intended to be illustrative and not restrictive), one social networking service user ("User B") may provide advertisement information to the effect that "I am a plumber, and I charge $40/hour".

Now, if a user (e.g., a mobile device user) carries out a search (e.g., using "Technique 1" described above or "Technique 2" described above), then the advertisement may be returned and shown (along with the other result(s)) to the user (even though the text in the advertisement is not in the search criteria). In one example (which example is intended to be illustrative and not restrictive) the advertisement may be displayed in a different color (e.g., a color different from the surrounding color).

As described herein, various embodiments of the present invention may provide for one or more of the following:

The user may utilize the invention to find friends, friends-of-friends, etc. by focusing a mobile device camera on a group of people.

In one example, if the user wants to find "friends" (e.g., as defined by a given social networking service), the user may type "Friend" in the search box as a search request. In another example, if the user wants to find "friends-of-friends", the user may type "Friend+1" in the search box as a search request. In another example, if the user wants to find "friends-of-friends-of-friends"), the user may type "Friend+2" in the search box as a search request.

Of course, the search results from these types of searches may be displayed to the user as described herein (e.g., one or more faces in a group of people may be highlighted or otherwise identified on the mobile device display screen).

This "friend-of-friend" type searching may make use of the idea of "Six degrees of separation (also referred to as the "Human Web") that describes the idea that everyone is on average approximately six "steps" away from another person on earth so that a chain of "a friend of a friend" statements can be made, on average, to connect any two people in six steps or fewer. This is thus a very powerful way to navigate the Human Web. It may be particularly powerful and useful when a person is traveling in a foreign country and the chances of finding a "Friend" or even a "Friend+1" would typically be fairly remote.

As described herein, various embodiments of the present invention may provide for one or more of the following:

A method and/or system that provides searching of a human being via use of a mobile phone camera to match human faces in a photo with some search criteria.

Sending specific profile search terms along with one or multiple sets of face data to use to mine data from a social networking service; sending "friend" level search request(s) along with one or multiple sets of face data to data mine from a social networking service; sending multiple sets of face data (from a group photograph) in conjunction with one or more of the above search types and using the result(s) to augment the original group photo with highlighted matches; and sending sets of face data and augmenting the photos (face data) with advertising information based on information from a social networking service.

Searching with face recognition and social networking profiles; storing the profile information in a social networking channel associated with one or more social networking services; enabling a user to type his or her search requirement(s); enabling a user to focus a mobile phone camera on a group of people; enabling the detection of the identification of one or more human beings based at least in part upon the search requirement(s); enabling users to advertise themselves; enabling a user to find friends by focusing the mobile phone camera toward an individual or a crowd and providing a friend level search requirement; and a six-step procedure for providing a highlighting for the identified faces in the captured image from a mobile phone camera (e.g., (1) user has focused the mobile phone camera on a crowd; (2) with face detection software every human face in the crowd will be identified (or detected), (3) software will gather the search requirement(s) of the user, (4) the search requirement(s) and identified face information will be sent to a social networking channel associated with one or more social networking services, (5) using facial recognition (or detection) software to identify faces which match the search criteria, and (6) highlighting the identified faces in the captured image).

In other examples, the present invention may provide a mobile device with augmented reality functionality.

In other examples, any steps described herein may be carried out in any appropriate desired order.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. The containment (or storage) of the program may be non-transitory.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any programming language or any combination of one or more programming languages, including an object oriented programming language such as Java, Smalltalk, C++ or the like or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described herein with reference to flowchart illustrations and/or block diagrams of methods, systems and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or other devices provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A computer-implemented system for interacting with a social networking service using a mobile device, wherein the social networking service has associated therewith a plurality of member profiles corresponding to a respective plurality of members, wherein each of the member profiles includes at least one member descriptor associated with a respective member, wherein each of the member profiles includes at least one member image associated with a respective member, wherein each member image includes a representation of a face of the respective member, and wherein the mobile device includes at least a camera and a screen, the system comprising:

a search service associated with the social networking service;

an application associated with the mobile device, wherein the application is in operative communication with the camera, wherein the application provides a user interface, wherein the application receives from the user interface at least one search term, wherein the application receives from the camera at least one source image, and wherein the source image includes a plurality of representations of a plurality of faces; and an Internet access mechanism associated with the mobile device, wherein the Internet access mechanism is in operative communication with the application and wherein the Internet access mechanism provides at least the search term and at least some of the representations of the faces in the source image to the search service;

wherein the search service is in operative communication with the social networking service, wherein the search service compares the search term to at least some of the member descriptors; wherein the search service compares at least one of the representations of the faces in the source image to at least some of the representations of the faces in the member images, and wherein the search service provides at least one result identifying at least one member who has: (a) a member descriptor that is a match to the search term; and (b) a member image including a representation of a face that is a match to a representation of a face in the source image;

wherein the search service sends the result back to the mobile device via at least the Internet access mechanism of the mobile device;

wherein the result that is sent back to the mobile device is displayed on the screen of the mobile device by augmenting the source image with at least one indicium identifying the at least one member who has: (a) a member descriptor that is a match to the search term; and (b) a member image including a representation of a face that is a match to a representation of a face in the source image: and wherein:

the search service provides at least a first result identifying at least a first member who has: (a) a member descriptor that is a match to the search term from the mobile device; and (b) a member image including a representation of a face that is a match to a first one of the representation of faces in the source image; and the search service provides at least a second result identifying at least a second member who has: (a) a member descriptor that is a match to the search term from the mobile device; and (b) a member image including a representation of a face that is a match to a second one of the representation of faces in the source image.

2. The system of claim 1, wherein:

the first result that is sent back to the mobile device is displayed on the screen of the mobile device by augmenting the source image with at least a first indicium identifying the first member; and the second result that is sent back to the mobile device is displayed on the screen of the mobile device by augmenting the source image with at least a second indicium identifying the second member.

3. The system of claim 1, wherein the search service is integrated into the social networking service.

4. The system of claim 1, wherein a member descriptor that is a match to the search term from the mobile device is an essentially exact match to the search term.

5. The system of claim 1, wherein a member descriptor that is a match to the search term from the mobile device is a match to the search term that is an approximate match within a degree of confidence.

6. The system of claim 1, wherein a representation of a face in a member image that is a match to a representation of a face in the source image is an essentially exact match.

7. The system of claim 1, wherein a representation of a face in a member image that is a match to a representation of a face in the source image is an approximate match within a degree of confidence.

8. The system of claim 1, wherein the search term comprises a plurality of search terms.

9. The system of claim 1, wherein the mobile device is selected from the group consisting of: (a) a mobile phone, (b) a tablet, (c) a PDA, and (d) a dedicated camera.

10. A computer-implemented system for interacting with a social networking service using a mobile device, wherein the social networking service has associated therewith a plurality of member profiles corresponding to a respective plurality of members, wherein each of the member profiles includes at least one member image associated with a respective member, wherein each member image includes a representation of a face of the respective member, and wherein the mobile device includes at least a camera and a screen, the system comprising:

a search service associated with the social networking service;

an application associated with the mobile device, wherein the application is in operative communication with the camera, wherein the application provides a user interface, wherein the application receives from the user interface at least one friend identifier, wherein the application receives from the camera at least one source image, and wherein the source image includes a plurality of representations of a plurality of faces; and an Internet access mechanism associated with the mobile device, wherein the Internet access mechanism is in operative communication with the application and wherein the Internet access mechanism provides at least the friend identifier and at least some of the representations of the faces in the source image to the search service;

wherein the search service is in operative communication with the social networking service, wherein the search service compares at least one of the representations of the faces in the source image to at least some of the representations of the faces in the member images associated with members who are indicated in the social networking service as friends of the member identified by the friend identifier, and wherein the search service provides at least one result identifying at least one member who is indicated in the social networking service as a friend of the member identified by the friend identifier and who has a member image including a representation of a face that is a match to a representation of a face in the source image;

wherein the search service sends the result back to the mobile device via at least the Internet access mechanism of the mobile device;

wherein the result that is sent back to the mobile device is displayed on the screen of the mobile device by augmenting the source image with at least one indicium identifying the at least one member who is indicated in the social networking service as a friend of the member identified by the friend identifier and who has a member image including a representation of a face that is a match to a representation of a face in the source image; and wherein:

the search service provides at least a first result identifying at least a first member who is indicated in the social networking service as a friend of the member identified by the friend identifier and who has a member image including a representation of a face that is a match to a representation of a face in the source image; and the search service provides at least a second result identifying at least a second member who is indicated in the social networking service as a friend of the member identified by the friend identifier and who has a member image including a representation of a face that is a match to a representation of a face in the source image.

11. The system of claim 10, wherein:
the first result that is sent back to the mobile device is displayed on the screen of the mobile device by augmenting the source image with at least a first indicium identifying the first member; and
the second result that is sent back to the mobile device is displayed on the screen of the mobile device by augmenting the source image with at least a second indicium identifying the second member.

12. The system of claim 10, wherein the search service is integrated into the social networking service.

13. The system of claim 10, wherein a representation of a face in a member image that is a match to a representation of a face in the source image is an essentially exact match.

14. The system of claim 10, wherein a representation of a face in a member image that is a match to a representation of a face in the source image is an approximate match within a degree of confidence.

15. The system of claim 10, wherein the friend identifier comprises a plurality of friend identifiers.

16. The system of claim 10, wherein:
the application further receives from the user interface a friend level indicator; and
the search service performs iterative searching of friends-of-friends based at least in part upon the friend level indicator and the friend identifier.

17. The system of claim 10, wherein the mobile device is selected from the group consisting of: (a) a mobile phone, (b) a tablet, (c) a PDA, and (d) a dedicated camera.

* * * * *